Dec. 15, 1942.  O. W. WENTZ  2,305,366
CONTAINER CONSTRUCTION
Filed May 13, 1939   4 Sheets-Sheet 1

Fig. 1.

INVENTOR
OSCAR W. WENTZ
BY William T. Kniesner
ATTORNEY

Dec. 15, 1942.    O. W. WENTZ    2,305,366
CONTAINER CONSTRUCTION
Filed May 13, 1939    4 Sheets-Sheet 2
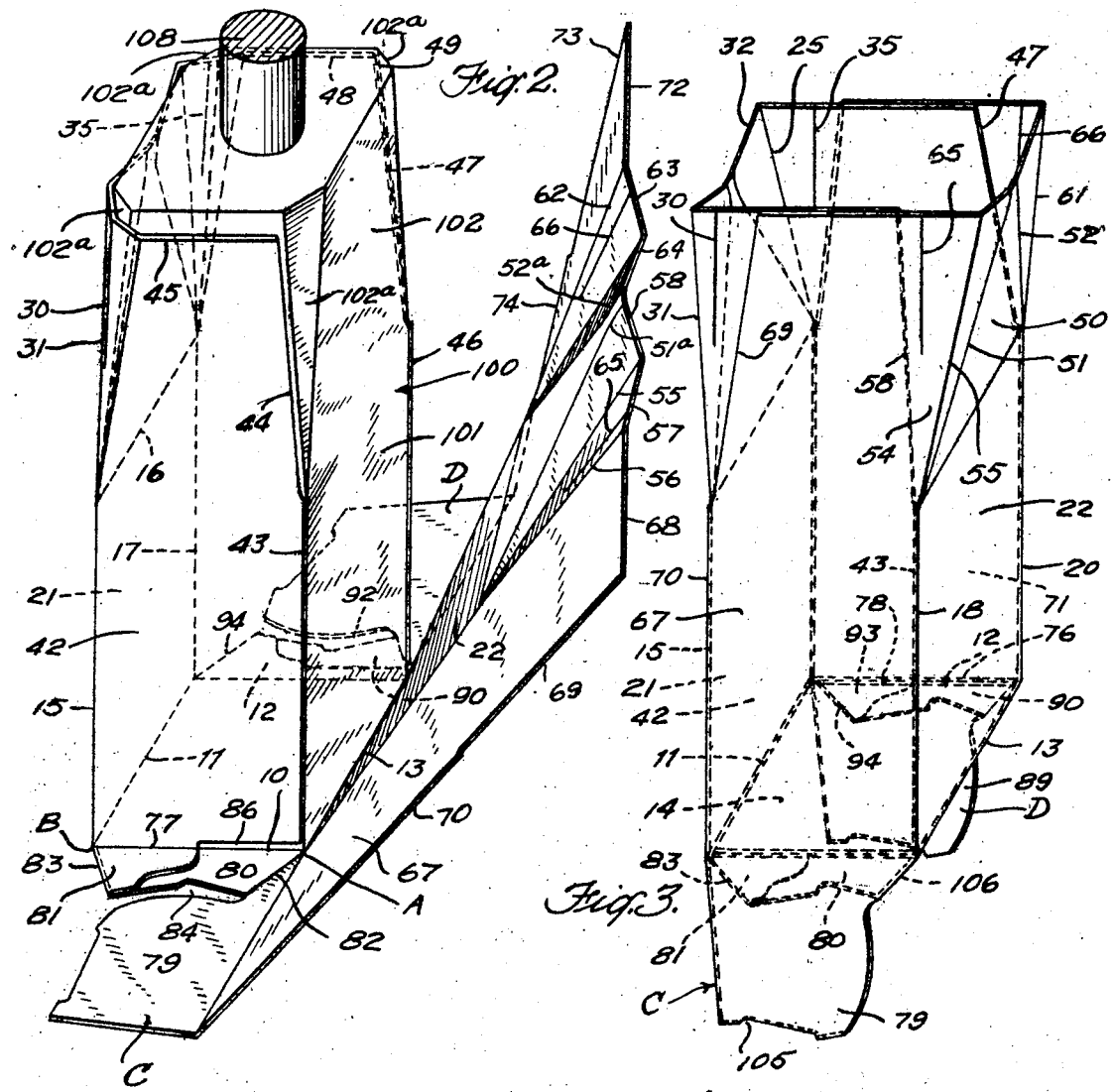
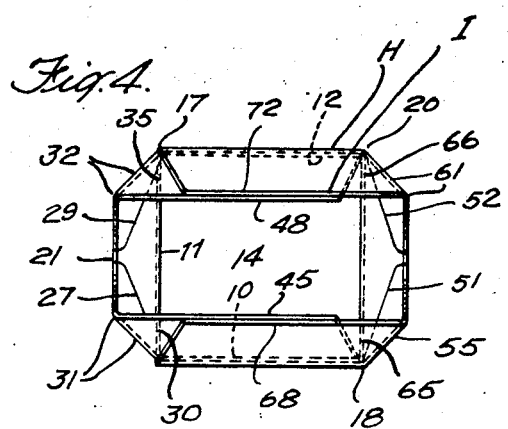
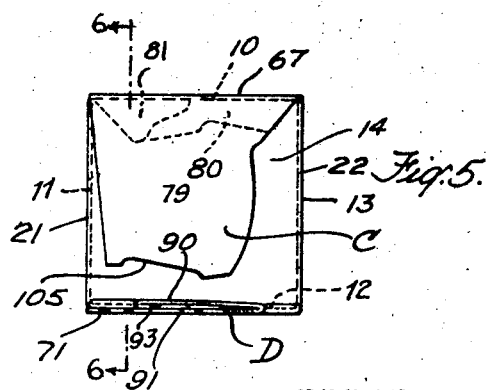
INVENTOR
OSCAR W. WENTZ.
BY
William T. Knissner
ATTORNEY Dec. 15, 1942.    O. W. WENTZ    2,305,366
CONTAINER CONSTRUCTION
Filed May 13, 1939    4 Sheets-Sheet 3
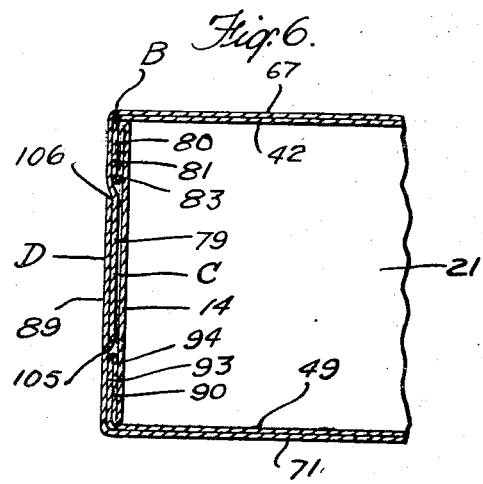
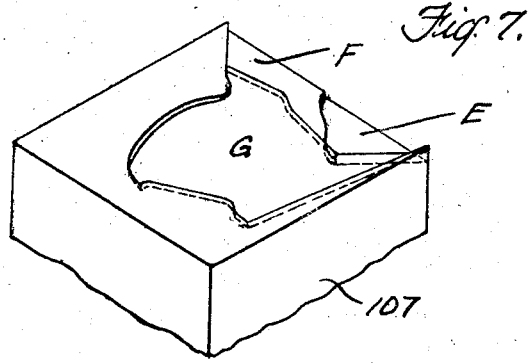
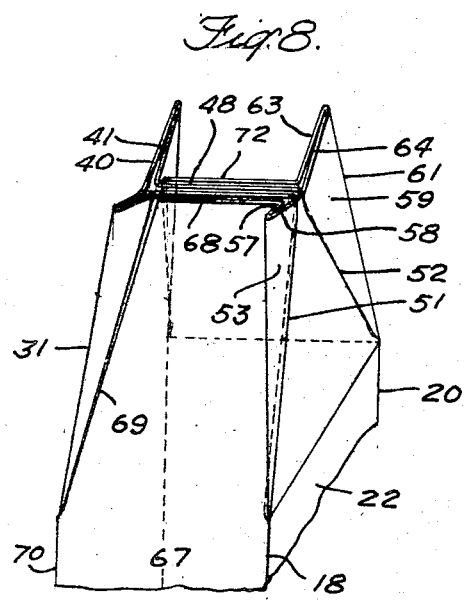
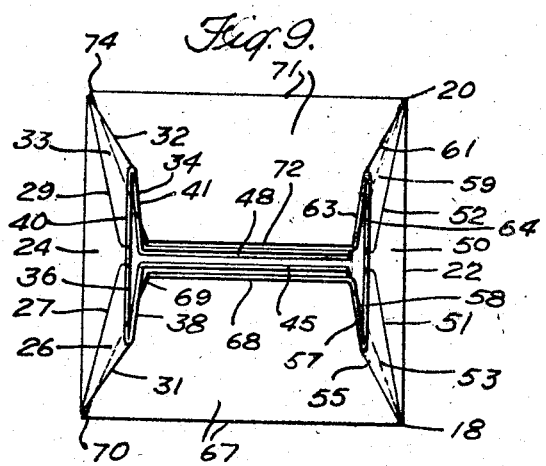
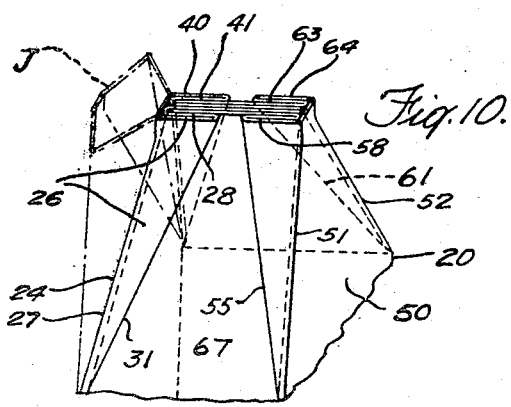
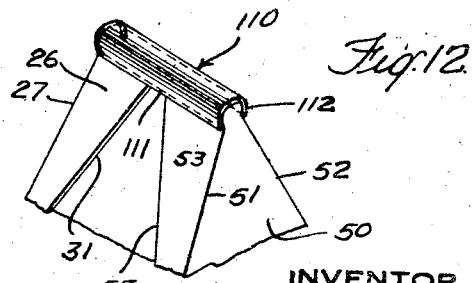
INVENTOR
OSCAR W. WENTZ.
BY
William T. Kniemer
ATTORNEY Dec. 15, 1942.   O. W. WENTZ   2,305,366
CONTAINER CONSTRUCTION
Filed May 13, 1939    4 Sheets-Sheet 4
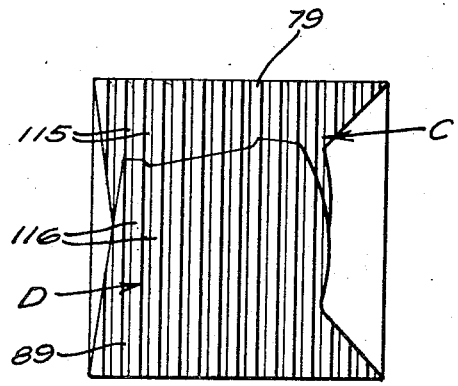
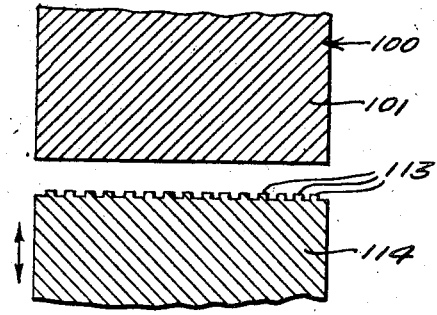
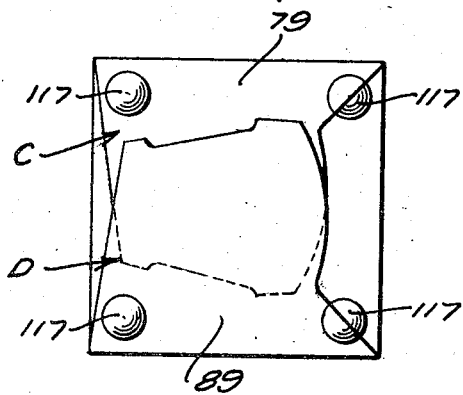
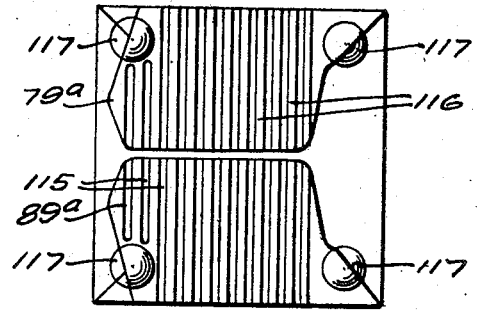
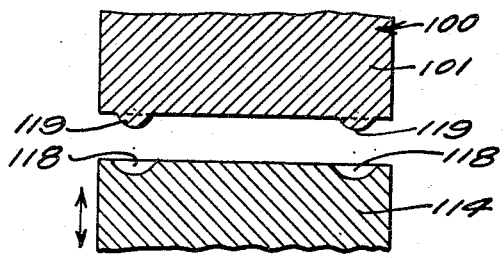
INVENTOR
OSCAR W. WENTZ
BY
William T. Kirsner
ATTORNEY Patented Dec. 15, 1942

2,305,366

UNITED STATES PATENT OFFICE 2,305,366

CONTAINER CONSTRUCTION

Oscar W. Wentz, Long Island City, N. Y., assignor to United States Automatic Box Machinery Co., Inc., Boston, Mass., a corporation of Massachusetts Application May 13, 1939, Serial No. 273,483

3 Claims. (Cl. 229—16)

This invention relates to container construction, more particularly to improvements in liquid-proof containers of paper or like material and in a method of making containers and enclosing the contents therein.

One of the objects of this invention is to provide a container construction made of a fibrous foldable sheet material like paper, cardboard, or the like, that will be efficient in the utilization of sheet material, capable of inexpensive, rapid and dependable manufacture and of efficient, inexpensive and reliable closure or sealing to enclose the contents therein. Another object is to provide a container construction of the above-mentioned character in which a simple, strong and efficient mutually reinforcing action is present between the folded closure at the top of the container and the closure at the bottom and intervening sides is achieved in a dependable, simple and inexpensive manner. Another object is to provide a container construction, foldable out of a blank or appropriately shaped sheet of material, that makes efficient use of the sheet material, reduces waste thereof, and effects further savings of material in effecting a top closure for the container.

Another object is to provide a practical, dependable method for effecting the folding of a container of the above-mentioned character out of a blank or suitably shaped sheet material, for minimizing or eliminating the possibility or risk of breakage or tearing of the material during the folding and like operations, and for facilitating the speedy and dependable actuation of such parts or devices as may be employed for mechanically carrying out certain of the steps. Another object is to provide a blank of paper or like sheet material shaped so that various flaps or folds may be folded or effected with minimum risk of interference, of breakage, or of tearing, and to make possible higher speed of folding operations. Another object is to provide a blank of paper or suitable sheet material shaped so as to be capable of being folded into a container body by mechanism including a so-called block but constructed in such a way that, without detracting from the achievement of certain other objects withdrawal of the block from the formed container body may be speedily and efficiently effected without risk of harm to the material of the container body. Another object is to provide a paper container construction well adapted for dependably handling liquids and well adapted to meet various requirements such as those varied requirements met with in the packaging and handling of, for example, milk, and well capable of withstanding the varied hazards of handling, carrying and transportation, as in milk deliveries, when filled. Another object is to provide a container construction of the above-mentioned character with the closure capable of convenient unfolding to provide an adequately large pouring spout for the discharge of the contents and which, when in closed or folded position, does not detract from the possibility of closely abutting one or more adjacent containers, thereby to insure maximum utilization of the space in which a plurality of filled containers may be arranged, as in a shipping or carrying case. Other objects will be in part obvious or in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

In the accompanying drawings in which are shown by way of illustration a preferred embodiment of the mechanical features of my invention and a preferred sequence of steps diagrammatically shown, Figure 1 is a plan of a blank;

Figures 2 and 3 are perspective views showing certain stages of folding;

Figure 4 is a view seen from the top in Figure 3;

Figure 5 is a bottom view at another stage;

Figure 6 is a section on line 6—6 of Figure 5;

Figure 7 is a perspective of a pressure member;

Figures 8, 9 and 10 are views of the closure end;

Figure 11 is a perspective of a closure clamp and Figure 12 is a perspective showing it applied;

Figure 13 is a bottom view and Figure 14 is a sectional view showing operating tools therefor and Figures 15 and 16 are bottom views and Figure 17 is a sectional view showing operating tools therefor.

Similar reference characters refer to similar parts throughout the several views in the drawings.

In making up the container of my invention, I prefer to make it out of a single piece or blank of suitable sheet material, hereinafter for convenience but not by way of limitation termed "paper," and the material may be of paper, cardboard, or other appropriate fibrous or cellulose material; in Figure 1 I have shown in development a preferred form of blank out of which to make the container. Illustratively and preferably the blank is in general rectangular in outline particularly where it is desired to achieve certain features of my invention, as later herein pointed out, though it is to be understood that the blank in outline may be varied in shape as may be dictated by other factors such as, for example, whether or not the container body is to be tapered so as to permit nesting of one body within the other.

In the illustrative embodiment it is assumed for purposes of illustration that the container body is not to be tapered and also that in cross-section it is to be substantially squared. Accordingly, and substantially centrally of the blank, I provide score or fold lines 10, 11, 12 and 13 outlining what is ultimately to become the square bottom 14, and respectively to the right and left of the bottom 14 score lines 15, 16, 17 and 18, 19 and 20 outline, with their respective bounding sides of the bottom 14, end walls 21 and 22, the latter being illustratively rectangular where no taper of the container body is to be provided.

For purposes later more fully explained, the score lines 15, 17 are extended toward the right to the edge of the blank, as at 23 and 25, respectively, these extensions 23 and 25 being outwardly divergent, as indicated, and preferably to a substantial degree. Score lines 27 and 29 form with the score line 16, with the latter as its base, a panel 24 which is shaped like a triangle, illustratively substantially equilateral, but these two score lines, rather than meeting in a point, are preferably made to diverge from each other as at 27ª and 29ª to terminate in the edge of the blank at spaced points.

Score lines 23 and 27 will be seen to subtend a substantial angle which is bisected by the score line 31, to provide triangular panels 26 and 28 of which the latter has formed therein a score line 30 which is in line with the score line 15 and preferably extends from the edge of the blank to a point about half way along the panel 28.

In like manner the area between score lines 25 and 29 is bisected by a score line 32 to provide the two triangular panels 33 and 34 of which the latter is provided with a score or fold line 25 that is in line with the score line 17 and which, like score line 30, may and preferably does fall short of meeting the score line 17.

Preferably triangular panels 26 and 28 are equal and the right-hand edge of the blank is cut, as indicated in Figure 1, to provide edge portions 36 and 38 which preferably make an angle to each other, as suggested in Figure 1. Similarly, panels 33 and 34 are preferably equal triangles with edge portions 40 and 41 shaped by appropriately cutting the edge of the blank.

To the upper side, as viewed in Figure 1, of the score lines 15—23, is outlined a side wall portion 42 preferably by cutting the edge of the blank, as at 43, to be parallel with the score line 15 and as at 44 to be symmetrical about the longitudinal center line of the side wall portion 42 with the score line 23, the part 42 being bounded preferably by a cut edge at its right-hand end which is preferably straight and at right angles to the above-mentioned center line.

In like manner, cut edges 46, 47 and 48 define with the score lines 15—25 a preferably equal and similar side wall portion 49.

To the left of the line of score line 13 of the bottom 14, the blank is scored, cut and shaped preferably to duplicate the above-described score lines, panels, etc., that are to the right of the line of score line 11 of the bottom. Thus, there is a triangular panel 50 bounded by score lines 19, 51, 51ª, 52 and 52ª, similar and preferably equal triangular panels 53 and 54 formed by the score lines 51, 55, 56 and the cut edges 57 and 58, and the two similar and preferably equal triangular panels 59 and 60 formed by the score lines 52, 61, 62, and the cut edges 63 and 64. Score lines 56 and 62 are thus preferably outwardly divergent extensions of the score lines 18, 20 of the end wall 22, while the triangular panels 54 and 60 contain score lines 65 and 66 which extend in line respectively with the score lines 18 and 20 and preferably fall short, as indicated, of joining the latter.

In like manner, there is a side wall portion 67 above the score lines 19, 56 formed by the preferably cut edges 68, 69 and 70. To the lower side of the score line 20, 62 is a side wall portion 71 defined in part by the latter and by the preferably cut edges 72, 73 and 74.

Again referring to Figure 1, it will be seen that score line 13 is extended at both ends in score lines 75 and 76 which, where the container is not to be tapered, preferably are in line with score line 13 itself, and in a similar manner score line 11 at the other side of the bottom 14 is extended as at 77 and 78. There are thus provided two areas in the blank subtended respectively by score lines 75, 10, 77 and 76, 12, 78; these areas are scored and cut preferably in an identical manner.

Thus, considering first the first of these areas, it is cut and scored to provide a large flap 79, a smaller flap 80, and a preferably still smaller flap 81, all preferably joined together and integral throughout and made readily foldable relative to each other by the score lines 82 and 83 which extend diagonally to the corners A and B of the bottom 14. Flap 79 is thus an extension of the side wall portion 67, being joined to it along the fold line 75 and will be seen to extend toward the side wall portion 42 to which it preferably just falls short of contacting because of the slot-like cut-out portion 84. Flap 81 is an extension of the side wall portion 42 being joined thereto along the fold line 77 and preferably and illustratively the base of the flap 81, being the fold line 77, falls short of being equal to the left-hand dimension of the side wall portion 42, illustratively about one-half of the latter, the remaining half being a cut edge 86. The intermediate flap 80 has for its base the fold line 10 and is bounded by the fold line 82 and 83 and by the cut edge 87 which forms part of the boundary of the irregularly shaped slot-like cut-out 84. The bounding cut edge 88 of the flap 81 is likewise part of the bounding edge of this cut-out 84.

In like manner, the other area has formed therein a large flap 89 separated from the smaller flap 90 by the diagonal score line 91 and the cut-out 92, and a preferably still smaller flap 93 separated from flap 90 by the score line 94. The cut-out 92 gives the three flaps irregular cut edges 95, 96 and 97, preferably symmetrical to the cut edges 86, 87 and 88, respectively, of the flaps 79, 80 and 81.

To a blank formed like that above described, adhesive may now be applied and the arrangement is preferably such as to gain the advantage of applying adhesive to surfaces on one side of the blank itself; adhesive is applied, as indicated in Figure 1, to the side wall portion 67, its flap extension 79, flaps 80 and 81, and to all of side wall portion 71, its flap extension 89, and to flaps 90 and 93, whence the folding operations may take place preferably with respect to and in connection with any suitable mechanism including a block 100 (Figure 2). Block 100 has a lower portion 101 which, where the container body is not tapered, is of uniform horizontal cross-section, a cross-section substantially matching the bottom 14 of the blank and in vertical dimension is equal to the height of the end walls 21, 22; it has an upper portion 102 which is shaped somewhat like that of a parallelopiped having a base whose cross-section is equal to the cross-section of the upper end of the block portion 101 (equal to the bottom 14 where there is no tapering of the container) and a corresponding upper face, but truncated at its corners, due to the gradual bevelling off of the corners as at 102ᵃ, as is indicated in Figure 2.

Any suitable means may be employed to relate the blank and the block 100 together with the lower end of block portion 101 having registered and held against it the bottom 14 of the blank, whereupon and as shown in Figure 2, that portion of the blank that is to left of the score line 77—11—78 is swung upwardly to bring the end wall 21 against and in registry with the left-hand vertical face of the block portion 101, against which it may be held; thereupon, the side wall portion 42 is swung or folded about the score line 15—31 to bring its lower part against the front face of the block portion 101 and its upper portion toward the face of the upper block portion 102; in like manner, the side wall portion 49 is folded about the score line 17—32 against the rear face of the block 101.

In accomplishing these folding steps flaps 81 and 80 are laid or folded against each other about the fold line 83 with their adhesive bearing surfaces in contact and the resultant composite flap is folded downwardly about the fold line 10 to assume a position substantially in the vertical plane of the side wall portion 42, leaving exposed, however, a substantial portion of the adhesive bearing face of flap 80 which for that purpose is preferably made larger in area than the flap 81.

A similar action takes place at the rear lower edge of the block 100 where flaps 93 and 90 are likewise folded against each other, leaving a substantial adhesive bearing area of the larger flap 90 exposed and the composite flap 90—93 being folded downwardly about the fold line 12.

Next the portion of the blank to the right of score line 75—13—76 is folded upwardly about the fold line 13 as an axis to bring the end wall 22 against the right-hand face of the lower block portion 101, whereupon the side wall portion 67 and its large flap extension 79, both bearing adhesive, are folded about score-line 18—55 in order thereby to superimpose the side wall portion 67 upon the side wall portion 42 which, in the illustrative embodiment, are preferably of the same shape and dimension, and since the part 67 carries the adhesive, these two now superimposed side wall portions 67 and 42 become secured together. During this folding operation, flap extension 79 is brought substantially into the vertical plane of the composite flap 80—81 against which the upper portion of its adhesive-bearing face is laid, thus providing the adhesive for securing flap 81 to flap extension 79 and for securing the exposed and adhesive-bearing portion of flap 80 to the upper portion of the flap extension 79. There results a composite flap made up of the interfolded and overlapping flaps 81, 80 and 79 of which the largest, namely flap 79, projects downwardly beyond the composite flap 80—81 to leave an exposed adhesive-bearing surface facing inwardly, as is better shown in Figure 3.

During these various folding operations, in which any suitable means may be employed for effecting the holding and folding of the various parts, any suitable means may be employed to apply appropriate pressure to such superimposed parts as may have adhesive therebetween, for insuring appropriate initial gripping by or setting of the adhesive. Also, there is applied appropriate pressure upon the upper trapezoidal portions of the side wall portions 67 and 42 to press them against the face of the upper block portion 102 and likewise with respect to the upper trapezoidal portions of the side wall portions 71 and 49 which are pressed against the corresponding opposite face of the block portion 102. The upper open mouth of the container is, ultimately after removal of block 100 and when viewed from above in Figure 3, narrower in one direction and longer in the other than the cross-section of the main body portion of the container, the former being rectangular, as at I in Figure 4, where the latter, in the illustrative embodiment, is square as at H. The side and end wall portions, above the main body portion of the container, thus merge, by appropriate inclinations thereof, from one of these shapes or cross-sections into the other, illustratively, as shown in Figures 3 and 4, along the score lines 55, 61, 32 and 27.

Thereupon, the composite flaps, still projecting downwardly below the plane of the bottom, as shown in Figure 3, are folded inwardly against the under face of the bottom 14 and about respective axes which comprise the now coincidental score lines 76, 12 and 78 on the one hand and 75, 10 and 77 on the other hand.

The folding of these composite flaps may be achieved in any desired or suitable manner but preferably one after the other. For example, composite flap C of Figure 3 and comprising the three flaps 79, 80 and 81 is first folded inwardly and upwardly against the under side of the bottom 14, that portion of the largest flap 79 that is uncovered by the others still bearing adhesive and that adhesive being preferably sufficient for securing flap C against the under side of the bottom. When that is completed the bottom view appears as in Figure 5 from which it will be seen that, with flap 79 shaped as above described, it covers a very substantial area of the bottom 14 and extends with an edge 105 facing toward the still depending composite flap D. The edge 105 of the large flap 79 is preferably shaped to be symmetrical to the upper cut edge, as viewed in Figure 1, of the flap 90, and in a like manner the edge 106 of the large flap 89 is cut or shaped to be symmetrical to or mate with the lower edge, as viewed in Figure 1, of the flap 80. Now when composite flap D is subsequently folded inwardly and upwardly toward the under side of the bottom 14 (Figure 3) or downwardly as viewed in Figure 5, the space left between the edge 105 of flap 79 and the side or score line 12 of the bottom 14, will be symmetrical to and accommodate therein the flap 90 of composite flap D, so that large flap 89 becomes laid down upon and secured by its adhesive to the exposed face of large flap 79. But the cut edge 106 of the large flap 89, when the latter is thus folded down, matches the outline of the upper edge, as viewed in Figure 5, of the intermediate flap 80. As a result, the various flaps become interleaved, as is better shown in Figure 6, and the bottom 14 will be seen to be reinforced by two thicknesses of material, namely, in going from left to right of Figure 6, a first section of reenforcement comprising intermediate flap 80, a portion of flap 79, then the end portion of flap 79 and the end portion of flap 89, and then the intermediate flap 90 and a portion of flap 89.

Upon the first folding operation of the composite flap C, the member employed to fold and/or press it against the bottom 14 is preferably embossed or engraved to provide areas of progressively differing depths; thus, in Figure 7 the operative face of such a member 107 is shown and it will be seen to have an area E shaped like the flap 81 which in depth approximates three thicknesses of the stock of which the blank is made, then an area F which in depth approximates two thicknesses of the material and is of a shape like that portion of intermediate flap 80 that is not covered by the smallest flap 81, and an area G of a depth approximating one thickness of the material and an area approximating or equalling that portion of large flap 79 that is left exposed by the flaps 80—81. Such a member 107 when pressed upwardly against the large composite flap C as in Figure 5 and with the bottom face of the block 100 (Figure 2) plane, insures the molding, as it were, of successive layers of material or of successively superimposed flaps downwardly against whatever stepped faces may be presented to them and also insures the application of adequate pressure to bring the adhesive-bearing faces dependably into action. The area G (Figure 7) is preferably contoured to approximate the outline of the large flap 79 (Figure 5) and hence its area may vary with the size and shape of the flap 79.

With composite flap C thus folded and pressed into place, and with composite flap D folded into place as already above described, another member or the member that actually effects the folding of flap D is effective to apply sufficient pressure to press the flap D and its parts downwardly against the supporting faces presented thereto and the face of such member may be stepped or contoured, in the manner described above in connection with the member 107 of Figure 7, to bring about an individual ironing down of individual portions or sections of the composite flap D itself; this, however, might be dispensed with and a plane faced member employed or one that has only a recessed area like the area E of Figure 7 but corresponding to the shape and area of flap 93 may suffice because of the interrelationship brought about by the right-hand portion of flap 79 (see Figure 6) with the flap 90 in virtually filling out the space or under side of the bottom 14 that is uncovered by the flap 90.

Thereby, a strong and dependable and liquid-proof bottom structure is achieved; in the preferred form and as appears in Figure 6, the bottom may have three thicknesses of material tightly secured together throughout substantially its entire expanse.

At the corners it will be seen that the stock forms, in the preferred arrangement, a multiple fold devoid of a line of cutting that runs to the corner itself, thus dependably precluding leakage at the corners, while the securing together and also against the bottom of the various flap portion and the above-described ironing down or stepped pressure effect insure the dependable closing against leakage of any paths that may exist between layers of the composite flaps or folds.

The block 100 and the thus far completed container are now ready for separation one from the other. For example, the container structure may be held against upward movement by any suitable means and the block 100, which may have any suitable connection as at 108 (Figure 2) with any appropriate means for moving it upwardly, is now started on its movement upwardly. But the lower block portion 101 is of the cross-section indicated at B in Figure 4 whereas the above-described folding operations have given the open end or mouth of the container the rectangular shape A of Figure 4, and it is through this latter opening that the block 100 has to be moved.

First, it will be noted that when the folding operations at the top of the container body are completed to give them the form shown in Figure 4, the score lines 30, 35, 66 and 65 (compare Figure 1 and Figure 4) and which in the blank of Figure 1 are in line with the score lines 15, 17, 20 and 18, respectively, become positioned as shown in Figures 3 and 4; in Figure 4 it will be seen that score lines 65 and 66 fall virtually in the plane of the end wall 22 (defined in part by the fold lines 20 and 18) and score lines 35 and 30 fall substantially in the plane of the end wall 21 (defined in part by the score lines 17 and 15), but that during the folding operations no bending or folding about the score lines 30, 35, 66 and 65 has thus far taken place.

As the block 100 starts its upward movement, the upper portion 102 begins to emerge from the mouth of the container (Figure 4) to the longer dimension of which it presents progressively thicker or wider portions as its upward movement proceeds, thus in effect widening up the rectangular opening I of Figure 4 and shortening its length, the bevels 102ᵃ aiding in this action, but by the time the substantially square lower portion 101 of the block 100 reaches, with its uppermost corners, the lower ends of the score lines 30, 35, 66 and 65, it begins the process of scoring up the upper portion of the container or of conforming it to the cross-section H, whence as it continues its upward movement, the corners of the portion 101 cause the triangular panel-like portions within which the above-mentioned score lines 30, 35, 66 and 65 extend each to become folded about the respective just-mentioned score lines, thereby avoiding tearing or breaking of this upper portion of the container and temporarily folding it, during the completion of the passage of the lower block portion 101 therethrough, into the cross-section H, illustratively square.

Upon completion of the withdrawal of the member 100, the creasing or folding along these fold lines is largely undone by the inherent tendency of the material or stock to return to unfolded position inasmuch as, it will be noted, the folding about the said fold lines is unaccompanied by the application of pressure or of an ironing action. Accordingly, the upper portion of the container returns generally to the shape and relationship shown in Figures 3 and 4.

The container may now be filled, it being preferable first to treat the material with paraffin, or the like, whence the upper open end may be folded into a closure.

This preferably proceeds by bringing the upper portions, in the illustrative and preferred embodiment (see Figure 4) of double thicknesses (see the edges 48—72 and 45—68), toward each other, the double thicknesses of the side walls 49—71 and 42—67 bending or curving inwardly toward each other to bring the four edges 72, 48, 45 and 68 together along a straight line, as is better shown in Figure 8, to form a straight line apex materially shorter than the width of the side walls themselves, due to the inclinations toward each other of the defining edges or fold lines at the upper ends of the side wall portions, such as the cut edge 69 and the fold line 56 of the side wall portion 67, for example (see Figures 1 and 8).

During this operation folding takes place along the score lines 55, 61, 32 and 31, as shown in Figure 8, leaving two lateral parts, one comprising the panels 59, 50 and 53 and the other comprising the panels 33, 24 and 26, inclined toward each other and respectively about the fold lines 19 and 16 at the upper ends of the end walls 22 and 21. At this stage the structure appears in plan view as is better shown in Figure 9, from which it will now be clear that triangular panels 59 and 60 become folded one against the other and likewise panels 53 and 54, panels 28 and 26, and panels 33 and 24. The resultant double folds or flaps thus formed are then folded inwardly to bring their double edges, such as edges 63 and 64, for example (Figure 10), in alinement with the above-mentioned straight line apex and leaving lateral inwardly inclined faces that comprise simply the large substantially triangularly shaped panels 24 and 50. There is thus formed a straight line apex preferably and in the illustrative embodiment comprising cut edges of the material related together in a plurality of thicknesses, the parts being preferably dimensioned and shaped so that substantially the same number of thicknesses, illustratively eight, of material extend along the apex, the apex, it being noted, being materially shorter in length than the dimension in its own direction of the main body portion of the container.

Upon this comparatively short apex of a plurality of thicknesses of material is now related any suitable means for securing the several thicknesses or the several overlapping end portions together and illustratively and preferably that comprises a short length of U-shaped sheet metal 110, as shown in Figure 11, the two wings or arms 111 and 112 of which are by any suitable means pressed toward each other to clamp the overlying upper end portions at the apex tightly together and hold them in sealing position, as shown in Figure 12. But thereby there is brought about a strong anchorage to this top apex of the various components of the composite flaps C and D.

For example, flaps 80 and 81, themselves secured together by adhesive, are mechanically connected through the side wall portion 42 to this apex, while the large flap 79 is connected to that apex by the side wall portion 67. Side wall portions 42 and 67, however, are secured together by adhesive and the flaps 80, 81 and 79 are anchored against the under side of the bottom 14, and thus the latter is securely and mechanically tied to this apex. Similar actions and structures mechanically tie the flap D and its components to the same apex. Accordingly, strains to which the bottom may be subjected, as in carrying a load, the liquid or other contents, or as may be incurred if the filled container is dropped, are distributed and dissipated throughout the container structure and to the top portion which, by reason of the various folds and its configuration, as better appears in Figures 10 and 12, is mechanically rigid and strong, the securing means, such as the clamping member 112, maintaining the mechanical integrity of this top portion.

Also, it will be noted that I am enabled to effect material saving because of the small length of the clamping member 112 as compared to the width of the container itself, and this saving in sheet metal of the clamping device may be on the order of one-third or one-half.

To gain access to the contents, the securing means is wholly or partially removed and in either case the double triangular flaps, such as flaps 26—28 and 33—34, may be unfolded, being easily grasped by the fingers of the hand because they are externally exposed, to form with the triangular panel 24, which swings outwardly, a pouring spout, as indicated in the broken lines at J in Figure 10.

As earlier above noted, pressure is applied to the interfolded composite flaps and against the under face of the portion 101 of block 100, to press the folded parts into folded position and also to bring about impregnation of the glue or adhesive; in order to diminish the time of application of such pressure and thus to speed up the folding operations, I may cross-rib the member through which the external pressure is applied, as indicated at 113 in Figure 14 where the pressure-applying member is indicated at 114 operatively related to the lower end of the block 100. The ribs 113 thus concentrate the applied pressure, giving the bottom, as seen in Figure 13, an external effect or contour which is the inverse of the face of member 114. Thus, each rib 113 creates a depression 115, leaving raised intervening rib-like portions 116. Thereby, also, a quicker ironing out or flattening out of the over-lapped flaps and a quicker setting of the adhesive is achieved and also additional rigidity given the bottom structure, while the ribs 116 present edge-like surfaces for contact with the surface upon which the container may be rested, thus making for greater cleanliness of appearance.

Or I may distribute at suitable points, preferably adjacent each of the four corners, suitable projecting portions 117, as shown in Figure 15, and these may be formed by giving the member 114 appropriate recesses 118 shaped, for example, like a segment of a sphere, so that the remaining surface of the member 114, which may be plane or may be cross-ribbed, as above described in connection with Figure 14, is effective to apply the force of compression against the under face of the block 100, thus to permit portions of the composite bottom structure to enter or flow or be pressed into the recesses 118. If desired, the under face of block 100 may be provided with substantially mating protrusions 119 (Figure 17) to press the composite bottom structure outwardly and hence into the recesses 118. If the large flaps 79 and 89 of the composite flaps C and D overlap, as indicated in Figure 15, the resultant and preferably spherical-surfaced protrusions 117 appear as shown in Figure 15. While if these large flaps do not overlap, as at 79ª and 89ª in Figure 16, the bottom structure appears as shown in Figure 16. If the face of the member 114 outside of the recesses 118 is given the desired configuration, like the cross-ribbing 113 of Figure 14, the composite bottom structure appears as shown in Figure 16 with the depressions 115 corresponding to the ribs 113 with intervening rib-like parts 116, as described above in connection with Figure 13, but preferably the downward protrusions 117 extend beyond the plane of the under face of the bottom and thus form four legs to contact with the surface on which the container is handled or rested, thus making for avoidance of picking up dirt or of becoming soiled throughout the entire under face of the bottom. The parts of the composite bottom structure that are thus pressed outwardly to form the protrusions 117 also aid in more quickly setting the folded parts against unfolding and in speeding up the corresponding folding and gluing operations. Also, greater tightness against leakage between contacting faces of the flaps and the bottom is assured.

Thus, it will be seen that there has been provided in this invention a container construction and method of achieving the same in which the various objects hereinabove noted, together with many thoroughly practical advantages, are successfully achieved.

As many possible embodiments may be made of the mechanical features of the above invention and as the art herein described might be varied in various parts, all without departing from the scope of the invention, it is to be understood that all matter hereinabove set forth, or shown in the accompanying drawings is to be interpreted as illustrative and not in a limiting sense.

I claim:

1. A paper container comprising a four-sided bottom and opposed end walls extended from two opposed sides of the bottom, each end wall having lateral extensions with juxtaposed extensions adhesively overlapped to form opposed side walls, the remaining two sides of said bottom having flaps extended therefrom and respectively connected to flaps of at least certain of said lateral extensions and respectively overlapping and being adhesively secured to the latter to form at least two composite flaps one at each of said two remaining sides of the container, the outermost flap of each composite flap being of greater area than an inner flap thereof, said two composite flaps being folded against said bottom with the end portions of said larger flaps overlapping and adhesively secured to each other and to said bottom, said larger flaps having end edges shaped substantially to mate with the contoured edges of the smaller flaps, thereby to maintain substantial uniformity of numbers of plies in the bottom.

2. A paper container comprising a four-sided bottom and opposed end walls extended from two opposed sides of the bottom, each end wall having lateral extensions with juxtaposed extensions adhesively overlapped to form opposed side walls, the remaining two sides of said bottom having flaps extended therefrom and respectively connected at their ends to flaps extended from said lateral extensions, thereby forming at each of said two remaining sides of the bottom a composite flap made up of three interfolded flaps, certain of the flaps of each composite flap differing in area whereby each composite flap has portions of different plies, said composite flaps being folded against said bottom and overlapping each other throughout respective portions so that at least one area of lesser ply than one composite flap overlaps a substantially corresponding area of lesser ply of the other composite flap.

3. A paper container comprising a four-sided bottom and opposed end walls extended from two opposed sides of the bottom, each end wall having lateral extensions with juxtaposed extensions adhesively overlapped to form opposed side walls, the remaining two sides of said bottom having flaps extended therefrom and respectively connected to flaps of at least certain of said lateral extensions and respectively overlapping and being adhesively secured to the latter to form at least two composite flaps one at each of said two remaining sides of the container, and said two composite flaps being folded against and adhesively secured to said bottom, the outermost flap of each composite flap being of greater area than the inner flap thereof and being of sufficient expanse to cause said two outer flaps to overlap each other, the overlapped portions of said larger flaps being adhesively secured together.

OSCAR W. WENTZ.